(12) United States Patent
Lutz

(10) Patent No.: US 8,584,468 B2
(45) Date of Patent: Nov. 19, 2013

(54) RELIABLE CARBON-NEUTRAL POWER GENERATION SYSTEM

(76) Inventor: Dale Robert Lutz, Maplewood, MN (US)

(*) Notice: Subject to any disclaimer, the term of this patent is extended or adjusted under 35 U.S.C. 154(b) by 1121 days.

(21) Appl. No.: 12/525,544

(22) PCT Filed: Jan. 10, 2008

(86) PCT No.: PCT/US2008/050805
§ 371 (c)(1),
(2), (4) Date: Aug. 2, 2009

(87) PCT Pub. No.: WO2008/100659
PCT Pub. Date: Aug. 21, 2008

(65) Prior Publication Data
US 2010/0132366 A1    Jun. 3, 2010

Related U.S. Application Data

(60) Provisional application No. 60/900,564, filed on Feb. 9, 2007, provisional application No. 60/905,377, filed on Mar. 7, 2007.

(51) Int. Cl.
*F02C 6/18*    (2006.01)
(52) U.S. Cl.
USPC .......................................................... 60/780
(58) Field of Classification Search
USPC ........................................ 60/39.5, 39.52, 780
See application file for complete search history.

(56) References Cited

U.S. PATENT DOCUMENTS

| | | | | |
|---|---|---|---|---|
| 3,459,953 A * | 8/1969 | Brauser et al. | ..................... | 290/2 |
| 3,488,401 A | 1/1970 | Ames | | |
| 4,676,063 A * | 6/1987 | Goebel et al. | ................... | 60/784 |
| 5,255,504 A * | 10/1993 | Hodrien et al. | ................. | 60/781 |
| 5,592,028 A | 1/1997 | Pritchard | | |
| 7,378,561 B2 | 5/2008 | Olah | | |
| 7,420,004 B2 | 9/2008 | Hardy et al. | | |
| 8,109,095 B2 * | 2/2012 | Henriksen et al. | .............. | 60/645 |
| 2004/0204503 A1 | 10/2004 | Beyer | | |
| 2006/0235091 A1 | 10/2006 | Olah et al. | | |
| 2006/0289003 A1 | 12/2006 | Lackner et al. | | |

FOREIGN PATENT DOCUMENTS

| | | |
|---|---|---|
| EP | 188071 A1 | 7/2008 |
| JP | 12-317302 A | 11/2000 |
| JP | 16-084489 A | 3/2004 |
| WO | 2006008482 A1 | 1/2006 |

(Continued)

OTHER PUBLICATIONS

George A. Olah, Alain Goeppert, G. K. Surya Prakash, "Beyond Oil and Gas: The Methanol Economy," 2006, preface and pp. 167, 172, 214, 224, 232, 239-243, 245, and 255-258, Wiley-VCH Verlag GmbH & Co. KGaA, Weinheim, Germany.

(Continued)

*Primary Examiner* — Phutthiwat Wongwian
(74) *Attorney, Agent, or Firm* — Vidas, Arrett & Steinkraus, P.A.

(57) ABSTRACT

Systems for providing reliable, controllable power without releasing the greenhouse gas carbon dioxide ($CO_2$) to the environment. Any $CO_2$ generated is captured and converted to hydrocarbons, which may be used as hydrocarbon feedstock or as additional fuel. Some of these systems can even reduce atmospheric carbon dioxide. The systems may utilize a carbon-neutral energy source.

27 Claims, 8 Drawing Sheets

(56) References Cited

FOREIGN PATENT DOCUMENTS

| | | |
|---|---|---|
| WO | 2006009600 A2 | 1/2006 |
| WO | 2007012150 A1 | 2/2007 |
| WO | 2008/103512 | 8/2008 |

OTHER PUBLICATIONS

George A. Olah, "Beyond Oil and Gas: The Methanol Economy," Angew. Chem. Int. Ed. 2005, 44, 2636-2639. See second column of p. 2637 through end of the article.

* cited by examiner

Traditional "Carbon-Positive" Energy Production

Prior Art

RELIABLE CARBON-NEUTRAL POWER GENERATION SYSTEM

CROSS REFERENCE TO RELATED APPLICATIONS

This application is a national stage entry of PCT/US2008/050805, filed Jan. 10, 2008, which claims priority to 60/900,564, filed Feb. 9, 2007 and 60/905377, filed Mar. 7, 2007.

RELATED APPLICATIONS

This application is related to commonly owned and currently pending patent application "Apparatus and Method for Collecting an Atmospheric Gas", U.S. Patent Application 60/900,564, filed Feb. 9, 2007, which is incorporated herein in its entirety, to the extent that it is not inconsistent with the present disclosure.

FIELD OF THE INVENTION

The present invention relates to systems for providing reliable, controllable output power without releasing the greenhouse gas carbon dioxide to the atmosphere. Operation of these systems may even reduce atmospheric carbon dioxide. The systems may utilize a carbon-neutral energy source, and may regenerate fuel for later use.

BACKGROUND

The Intergovernmental Panel on Climate Change (IPCC) report released by the United Nations on Feb. 2, 2007 states that it is unequivocal that climate change due to global warming is occurring and that it is at least 90 percent certain that humans are responsible. A major cause of this warming is the increased concentration of the "greenhouse gas" carbon dioxide ($CO_2$) in the atmosphere, primarily due to humans burning hydrocarbon fossil fuels to produce energy for transportation and electrical power generation. See FIG. 1. To address the problem of global warming, several countries who are signatories of the Kyoto Protocol agreement are establishing laws to reduce the rate of carbon dioxide emission within their jurisdictions. Several state and local governments in the United States of America are also implementing such laws. One of the legal approaches being used in Europe and elsewhere is a "cap and trade" system. With this approach, decreasing annual limits are set on the total amount of carbon dioxide emitted by each company. Companies that go over their annual cap might be fined. However, efficient companies that emit less than their cap amount earn "carbon credits" that can be sold or traded to excess emitters. According to an article in the Feb. 14, 2007, edition of the Saint Paul Pioneer Press newspaper of Saint Paul, Minn., USA, there are now firms such as London-based "Sindicatum Carbon Capital Ltd., which develops projects that produce emission credits." The article also states that "Global emissions-permit trading was worth about $21.5 billion in the first nine months of 2006, almost double the $11 billion in all of the previous year, the World Bank said in October."

A Feb. 3, 2007, newspaper article by Thomas H. Maugh II and Karen Kaplan of the Los Angeles Times states that the IPCC report "also said warming would continue even in the extremely unlikely event that global carbon dioxide could be stabilized at its current level. Such a stabilization would require an immediate 70 percent to 80 percent reduction in emissions, said Richard Somerville of the Scripps Institution of Oceanography in San Diego." The carbon dioxide level persists and builds up because the main natural mechanism for "permanently" removing carbon dioxide from the atmosphere is the process of photosynthesis, in which plants use energy from sunlight to convert carbon dioxide and water into plant tissue materials such as sugars and cellulose. The total plant population of the earth cannot consume carbon dioxide at a rate equal to the current rate of carbon dioxide emission from human activities. Carbon dioxide can be "temporarily" removed from the atmosphere when it dissolves in bodies of water such as the ocean, forming carbonic acid. This carbonic acid may react with certain ions in the water to form relatively insoluble materials, such as calcium carbonate (limestone). Coral polyp animals use this process to form their coral reef homes. However, excess carbonic acid raises the acidity of the water, endangering the lifeforms living in the bodies of water. Recent "bleaching" of coral reefs has been attributed to this acidification of the ocean, accompanied by the water temperature increases due to global warming However, if the "carbonated" water warms up or the air pressure above the water is reduced, some of the carbonic acid decomposes and carbon dioxide is released back into the air. An example of this decomposition process is the $CO_2$ bubble formation and "fizzing" which results from the pressure release upon opening a container of a carbonated beverage.

In order to meet $CO_2$ emission reduction targets of present or future regulations such as those based on the Kyoto Protocol, some power generation stations are experimenting with an approach called "carbon sequestration." In this approach, $CO_2$ gas emitted during the burning of coal or other fossil fuels is trapped at the source and pumped underground. In favorable locations, this gas could be used to pressurize underground petroleum reservoirs, to enhance oil recovery. However, there is no guarantee that the $CO_2$ will not eventually leak back to the surface and re-enter the atmosphere. Such a sequestration approach is proposed by David Keith in the following paper: David W. Keith, Minh Ha-Duong and Joshuah K. Stolaroff (2005). Climate strategy with CO2 capture from the air. *Climatic Change*, published on line, DOI: Oct. 1, 2007/s10584-005-9026-x Dr. Keith's proposed carbon trapping is based on reacting $CO_2$ gas with an NaOH solution, then reacting this solution with CaO to form lime (calcium carbonate), then heating the lime to release the $CO_2$ gas again. A large amount of energy is needed for the heating process, thus reducing the net energy output of the power generation station.

There is currently a social movement to develop and deploy "carbon-neutral" technologies for energy generation, technologies that do not emit carbon dioxide. An example of this would be a wind turbine generator. While considerable $CO_2$ might be emitted generating the energy used in manufacturing a wind turbine, when the final device is in operation, no additional $CO_2$ is released. Thus, the manufacturing process may be "carbon-positive" (net $CO_2$ emissions), but the operation of the finished wind turbine is "carbon-neutral". If the process of manufacturing a second turbine uses an amount of energy equal to the lifetime energy output of the first turbine, then both the manufacturing of the second turbine and its total energy output will effectively be completely "carbon-neutral". For purposes of this patent application, technologies that are "carbon-neutral" during operation will be referred to as "carbon-neutral" energy sources. Other "carbon-neutral" energy source technologies can include solar photovoltaic, solar thermal, hydroelectric, tidal hydroelectric, wave action hydroelectric (such as the SEADOG™ pump, U.S. Pat. Nos. 6,953,328 and 7,059,123, available from Independent Natural Resources, Inc. (INRI), Eden Prairie, Minn., USA), nuclear, and geothermal. Unfortunately, some carbon-neutral technologies, particular solar and wind, are intermittent. Thus, they are not well suited as the sole power source for applications requiring continuous reliability, such as electrical utilities or vehicle propulsion.

The electrical utilities industry in the United States has its prices set by a government commission, and must petition the commission to approve any rate increases. The industry frequently expects any new equipment to last for 50 years in service. State and federal governments are discussing legislation that would require electrical utilities to reduce their total $CO_2$ emission, and to obtain some minimum percentage of their total electrical output from "renewable energy" sources in a few years. Utility company executives are beginning to request that the federal government establish these laws soon, so the utilities will be able to plan and design equipment that will meet the new standards as they install their next equipment upgrades. It would be valuable if the next equipment could be retrofitted into the large installed base of power generation equipment, to reduce greenhouse gas emissions of current equipment. It would also be useful if the new systems could provide flexibility to ease the transition from the current installed base to a future infrastructure based on "renewable energy" sources and more sustainable systems.

While the electrical utilities industry is currently developing approaches that may take them at least part way to their $CO_2$ reduction targets, the transportation industry, and particularly airplanes and ocean-going vessels, have more difficult challenges. Vehicles must generally carry their fuel or energy source with them over long distances. Batteries or fuel cells may work for automobiles, once the technology and the "refueling" infrastructure are developed, but these energy sources tend to be heavy, and sometimes bulky. Airlines in particular require light weight, compact, efficient energy sources, and it is difficult to see how fossil fuels and their accompanying $CO_2$ emissions would be replaced in this industry any time soon. Therefore, the airline industry (and others) will be strongly "carbon-positive" for the foreseeable future. In "cap and trade" countries, such industries will be under pressure to buy increasing amounts of increasingly expensive "carbon credits" from other companies. If a "carbon-negative" technology could be developed that would collect $CO_2$ from the atmosphere and convert the carbon to a useful non-gaseous form, the industries that are forced to use fossil fuels could use this $CO_2$ collection/remediation technology to offset their emissions, thereby meeting their net $CO_2$ emission cap targets. Such a "carbon-negative" technology has been described in the commonly owned and currently pending patent application "Apparatus and Method for Collecting an Atmospheric Gas", U.S. Patent Application 60/900,564, filed Feb. 9, 2007, which is incorporated herein by reference in its entirety.

Some preliminary efforts have been made at developing technologies that could chemically convert greenhouse gases such as $CO_2$ into other materials using process that might be considered carbon-negative. See, for example, U.S. Pat. No. 7,140,181, "Reactor for solar processing of slightly-absorbing or transparent gases", Jensen, et al., and U.S. Pat. No. 6,066,187, "Solar reduction of CO.sub.2", also by Jensen, et al. However, these are energy-intensive, high temperature processes, requiring intense concentrated sunlight and associated expensive equipment. Furthermore, these patents do not address the problem of collecting the greenhouse gas from the atmosphere and concentrating the gas to make the subsequent chemical reaction processes more efficient.

Other interesting related technologies are discussed in the following documents: U.S. Pat. No. 4,478,699, "Photosynthetic solar energy collector and process for its use", Hallman, et al.; U.S. Pat. No. 4,240,882, "Gas fixation solar cell using gas diffusion semiconductor electrode", Ang, et al.; and U.S. Pat. No. 4,160,816, "Process for storing solar energy in the form of an electrochemically generated compound", Williams, et al. These patents also do not adequately address the problem of removing the greenhouse gas from the atmosphere.

Thus, as the world seeks to control greenhouse gas concentrations in the atmosphere and to transition to renewable energy sources and a more environmentally sustainable power generation infrastructure, there is a need for a technology capable of allowing existing fossil fuel based energy technologies to be modified to operate with no net greenhouse gas emission, or even to operate with a net reduction of atmospheric greenhouse gas concentration.

SUMMARY OF THE INVENTION

The present invention allows a power generation facility to collect carbon-neutral energy intermittently, use this energy to extract $CO_2$ greenhouse gas from the atmosphere, and chemically reduce the $CO_2$ in order to locally create fuel for a fossil fuel based power generation system that can then provide reliable continuous power. If the fossil fuel based power generation system is a conventional power plant, it would preferably also be equipped with a device to capture the $CO_2$ generated when burning the fuel, and would recycle this $CO_2$ through the same process. Such local generation of fuel would save the cost and associated greenhouse gas emission of extracting fossil fuels from the earth, refining the fossil fuels, and transporting them to the power plant location. Some of the $CO_2$ extracted from the atmosphere would thus be recycled within the system and would serve as a storage device for the intermittently-collected carbon-neutral energy. The excess $CO_2$ extracted could be converted into hydrocarbon feedstock for plastics and other products. The carbon-neutral energy could also be used to generate $H_2$ gas from electrolysis of water. Some of this $H_2$ could be used to chemically reduce the $CO_2$ to fuel. Excess $H_2$ gas could be used to power hybrid vehicles and fuel cells. Such an integrated system could provide a flexible transition technology as society moves from fossil fuel to renewable, carbon-neutral energy sources. The proposed system can remove atmospheric $CO_2$, produce $H_2$ fuel for hybrid vehicles and fuel cells, produce hydrocarbon feedstock, and produce fuel for conventional power plants that preferable have $CO_2$ recapture equipment. These various functions can be performed in variable proportions as needed. Such hybrid power generation systems would provide a carbon-neutral, or even carbon-negative, technology having the continuous reliability of current fossil fuel based power generation technologies.

One aspect of the present invention is a power generation system having a carbon-neutral energy source and a fuel production system powered at least in part by the carbon-neutral energy source, in which the fuel production system can produce at least one fuel using air, water, or both as raw materials. The system also includes a power generation subsystem that can generate power using energy from the produced fuel.

The invention may further include a capture device that captures at least one chemical reaction product, such as carbon dioxide, that is produced by burning or using the fuel. This captured reaction product may be used to make additional fuel. This fuel could be hydrogen or hydrocarbons. The capture device may include a cooled device for condensing gases to liquids or solids. The reaction products may reach the cooled device by passing through a counter-flow heat exchanger.

The invention may be part of a mobile system, such as a partially solar-powered automobile, ship, or other vehicle. The power generation system of this invention may also include at least one fuel cell.

Another aspect of this invention is a power generation system that provides reliable, controllable power without releasing carbon dioxide greenhouse gas to the atmosphere. This embodiment has a power generation subsystem that uses energy from chemical reactions of a fuel, a capture device that captures at least one chemical reaction product (such as $CO_2$) from burning or using the fuel, and a fuel production system that can produce additional fuel using the captured reaction product as the primary raw material. The capture device may include a cooled device for condensing gases to liquids or solids. The reaction products may reach the cooled device by passing through a counter-flow heat exchanger.

BRIEF DESCRIPTION OF THE FIGURES

The invention may be more completely understood and appreciated in consideration of the following detailed description of various embodiments of the invention in connection with the accompanying drawings, in which.

The same reference numeral used in multiple figures refers to the same or similar elements having the same or similar properties and functionalities.

DETAILED DESCRIPTION

Figure 1:
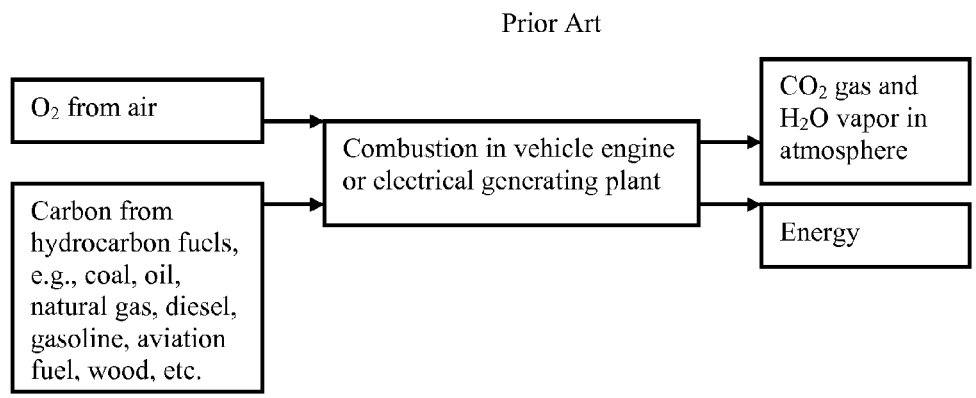
FIG. 1 schematically illustrates the net increase of the greenhouse gas carbon dioxide in the atmosphere as a result of burning hydrocarbon fuels to produce energy.
Figure 2:
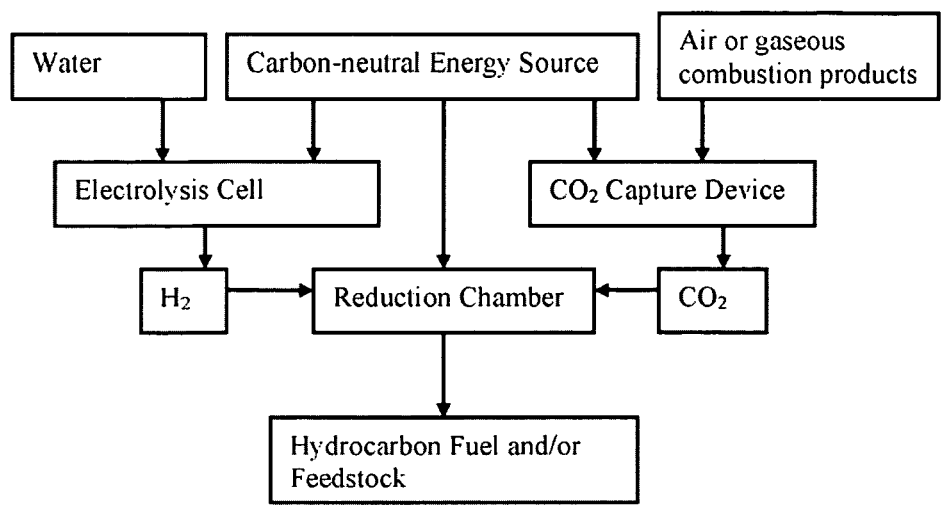
FIG. 2 shows a schematic diagram of a $CO_2$ conversion system including the $CO_2$ capture device of this invention.

The present invention includes a carbon-neutral energy source that provides at least a portion of the energy required to operate an "air capture" device that can collect $CO_2$ from the earth's atmosphere, as shown in the upper right of FIG. 2. One example of such a device is the $NaOH$, $CaCO_3$ cycle device proposed by Prof David Keith in his paper "Climate strategy with CO2 capture from the air", mentioned above. Another example is the invention disclosed in commonly owned and currently pending patent application "Apparatus and Method for Collecting an Atmospheric Gas", 60,900,564, filed Feb. 9, 2007, one embodiment of which is described below.

In addition, the present invention may also use the same or a different carbon-neutral energy source to generate $H_2$ gas from water in, for example, an electrolytic cell or a reversible hydrogen fuel cell, as shown in the upper left of FIG. 2. The $H_2$ gas may be used as a fuel, or may be chemically combined with the captured $CO_2$ in a reduction chamber to produce hydrocarbon fuels or hydrocarbon feedstock, as shown in the lower portion of FIG. 2.

The present invention also includes a power generation subsystem receiving energy from a fuel reaction chamber capable of using either the generated $H_2$ gas or the hydrocarbon fuel to generate power. The fuel reaction chamber optionally is coupled with an "air capture" device that can collect $CO_2$ from the combustion products produced by the fuel reaction chamber if it is using hydrocarbon fuel. The "air capture" device may be the same device that is used to collect $CO_2$ from the earth's atmosphere, or it may be a separate device. The power generation subsystem could be, for example, a fossil fuel based electrical utility power plant, an internal combustion engine, the engine of a hydrogen powered vehicle, or a hydrogen fuel cell.

Figure 3:
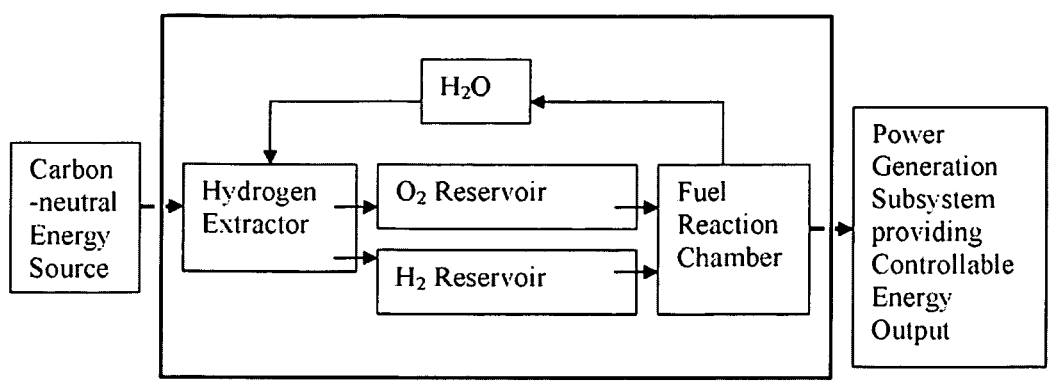
FIG. 3 shows a closed system based on water as a working fluid, in which energy but not matter crosses the system boundary.

A first embodiment of the present invention is shown in FIG. 3. This is a "closed system", in which no material need be transferred into or out of the system. Water ($H_2O$) serves as the "working fluid" for the system. A carbon-neutral energy source, which may be intermittent, is used to power a hydrogen extractor, such as an electrolytic cell, that separates water into hydrogen and oxygen. These materials are stored in respective hydrogen and oxygen reservoirs. As energy is needed, the hydrogen and oxygen are fed to a fuel reaction chamber, where they react to reform water and produce a continuous or controllable energy output. The water is returned to the hydrogen extractor to continue the cycle. Thus, this system collects intermittent, unreliable energy as available from a carbon-neutral source, stores the energy as "potential chemical energy" in the form of separated hydrogen and oxygen, and releases the energy at a desired rate as a controllable energy output. In FIG. 3, the closed material system is shown within the boundary marked by the largest rectangle. Energy from a carbon-neutral energy source enters the closed system at the left of the diagram, as indicated by the dashed arrow. At the right side of the diagram, a controllable energy output leaves or is generated by the system, as indicated by the second dashed arrow. The system of FIG. 3 might be used in a mobile system, such as a solar-powered automobile or an ocean-going vessel using solar or wind energy, or both.

Figure 4:
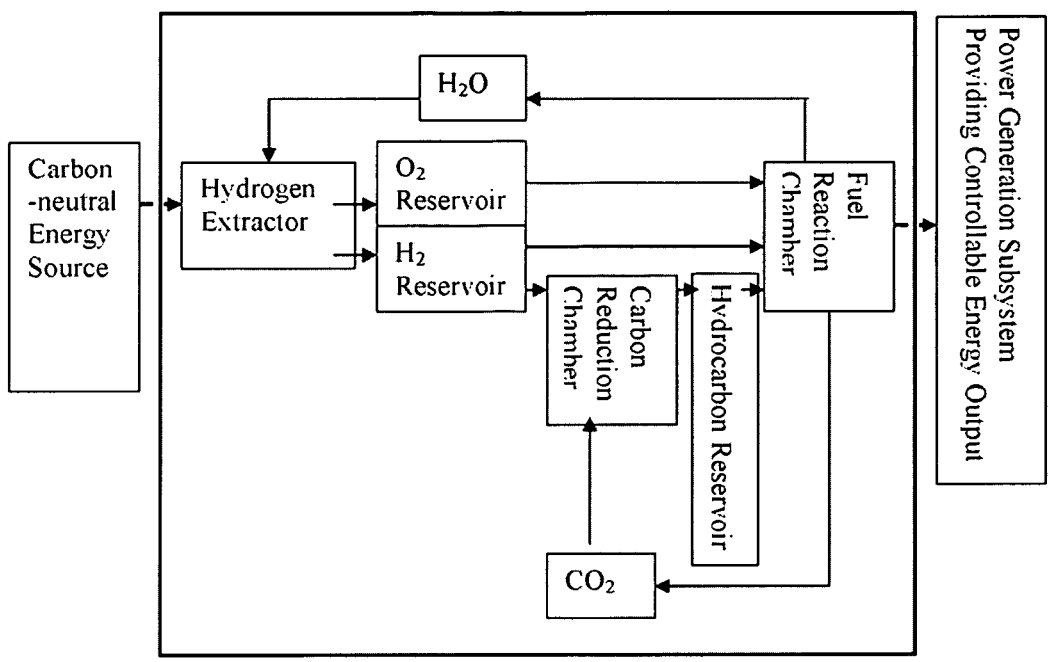
FIG. 4 shows a closed system based on water and carbon dioxide as working fluids, in which energy but not matter crosses the system boundary.

FIG. 4 shows a second "closed system" embodiment of the invention, in which both water and carbon dioxide may be considered to be the "working fluids". As in FIG. 3, the closed material system is shown within the boundary marked by the largest rectangle. Again, a carbon-neutral energy source, which may be intermittent, is used to power a hydrogen extractor, such as an electrolytic cell, that separates water into hydrogen and oxygen. These materials are stored in respective hydrogen and oxygen reservoirs. However, hydrogen may be further reacted with carbon dioxide in a carbon reduction chamber to produce various hydrocarbon fuels, which are then stored in a hydrocarbon reservoir. (The carbon reduction chamber is so named because the carbon in carbon dioxide undergoes chemical reduction to a lower oxidation state in these reactions.) Example chemical reactions include the Sabatier methanation reaction and the reverse water-gas shift reaction (WGS), as described in the paper "Carbon Dioxide Conversions in Microreactors", by D. P. VanderWeil, et al., of Pacific Northwest National Laboratory The hydrocarbons produced in the carbon reduction chamber may be liquids or solids, and thus would require much less storage space than hydrogen and carbon dioxide gases. As energy is needed, the hydrocarbons, hydrogen, or both, may be combined with oxygen in the fuel reaction chamber to produce a controllable energy output. The fuel reaction produces water (probably as vapor) and carbon dioxide, which are collected and recycled within the system. Energy from a carbon-neutral energy source enters the closed system at the left of the diagram, as indicated by the dashed arrow. At the right side of the diagram, a controllable energy output leaves or is generated by the system, as indicated by the second dashed arrow.

FIG. 2 shows a group of interconnected processes that use a carbon-neutral energy source, air, and water (the water being either extracted from the air, e.g., as described in detail below in FIGS. 6 and 7, or from local sources) to remove the greenhouse gas $CO_2$ from the atmosphere (or from gaseous combustion products such as those generated in the fuel reaction chamber of FIG. 4) and to chemically convert the gas to other chemical compounds or forms of carbon that do not contribute to climate change. These other chemical forms of carbon may be more compact for transport, and may be useful hydrocarbon feedstocks for producing polymers, medicines, (carbon-positive) fuels, or even foodstuffs such as sugars and amino acids. In FIG. 2, a known quantity of relatively pure $CO_2$ is obtained from a gas collection system such as the one shown in FIG. 6 or 7. The $CO_2$ could be collected in reservoir 170 of FIG. 6. Also, water obtained from the gas collector in FIG. 6 (e.g., in auxiliary reservoir 171) or from other sources is provided to an electrolysis cell, the cell being powered by a carbon-neutral energy source, possibly the same source that is also used to power the gas collector of FIG. 6. Auxiliary reservoir 171 in FIG. 6 could be such an electrolysis cell. The electrolysis cell splits the water into its elemental components, hydrogen and oxygen, by any of a variety of means commonly known in the art, as shown in equation (1) below.

$$2\ H_2O + energy \Rightarrow 2\ H_2 + O_2 \tag{1}$$

A known quantity of the generated hydrogen is then collected and combined with a known amount of $CO_2$ in a reaction chamber. Collection chamber 130 or reservoir 170 in FIG. 6 could also serve as such a reaction chamber. (The generated hydrogen gas could be made to flow back through the collection chamber 130 to reservoir/reaction chamber 170, or a cross-connect pipe could be supplied connecting chambers 171 and 170.) Energy from a carbon-neutral energy source is then applied to the reaction chamber, in the form of one or more of heat, pressure, electromagnetic radiation, or an electric spark/arc, to initiate a chemical reaction between the hydrogen and the carbon dioxide. Optionally, other materials such as nitrogen gas may be introduced into the reaction chamber at some stage in the process. A variety of useful chemical compounds may be produced in the reaction chamber, depending on:

1) the reaction conditions;
2) the relative amounts of hydrogen and carbon dioxide; and
3) the presence of any catalytic species.

For example, the hydrogen could reduce the $CO_2$ to elemental carbon, C, the material of graphite and diamonds, as shown in equation 2.

$$2\ H_2 + CO_2 + energy \Rightarrow 2\ H_2O + C \tag{2}$$

Varying ratios of $H_2$ and $CO_2$ under appropriate reaction conditions can also produce a range of other useful hydrocarbons, as shown below.

$$H_2 + CO_2 + energy \Rightarrow HCOOH\ (formic\ acid) \tag{3}$$

$$2\ H_2 + CO_2 + energy \Rightarrow H_2O + H_2CO\ (formaldehyde) \tag{4}$$

$$3\ H_2 + CO_2 + energy \Rightarrow H_2O + H_3COH\ (methyl\ alcohol) \tag{5}$$

$$4\ H_2 + CO_2 + energy \Rightarrow 2\ H_2O + CH_4\ (methane,\ natural\ gas) \tag{6}$$

(Equation 6 is the Sabatier methanation reaction mentioned above.)

Under appropriate conditions, formaldehyde from equation 4 could be converted to polyoxymethylene, a polymer having excellent mechanical and high temperature properties, sold under trade names such as Delrin. See equation (7) below.

$$H_2 + nH_2CO \Rightarrow H-[CH_2-O-]_n-H\ (polyoxymethylene) \tag{7}$$

As suggested above, introducing controlled amounts of atmospheric nitrogen gas or other nitrogen compounds into the reaction chamber would permit the synthesis of an even broader range of organic compounds, including foodstuffs such as amino acids.

Figure 5:
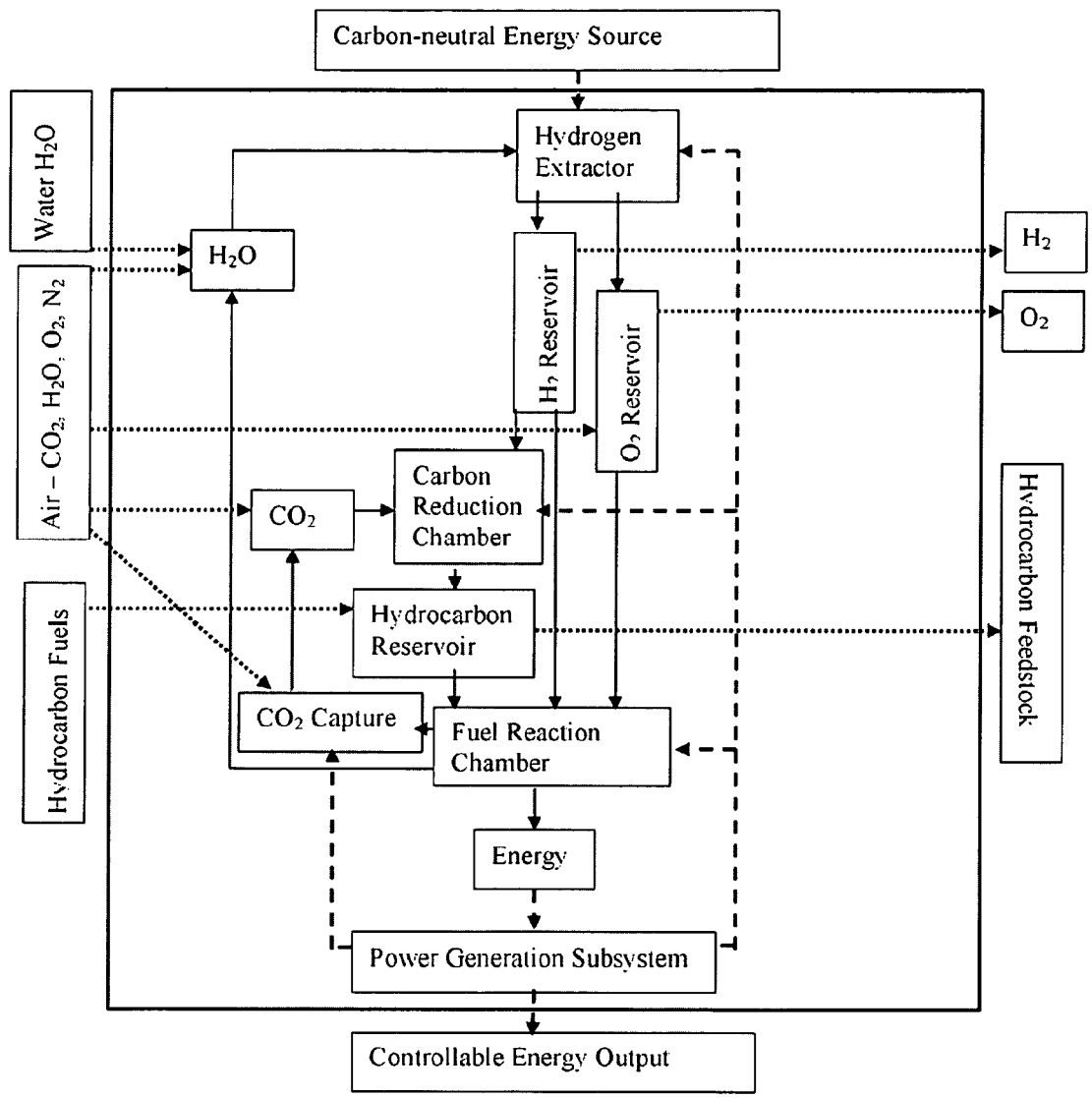
FIG. 5 schematically illustrates a system in which air, water, hydrocarbon fuels, and a carbon-neutral energy source are used to provide reliable, controllable output power without releasing carbon dioxide to the atmosphere.

FIG. 5 shows an "open system" embodiment of the present invention, in which matter can also pass into and out of the system. The largest rectangle marks the boundary of the system. In addition to the energy input from a carbon-neutral energy source, as indicated at the top of the diagram, this system also uses material inputs of air, water, and optionally hydrocarbon fuels, as indicated along the left side of the diagram by the dotted arrows. In addition to the controllable energy output indicated by the dashed arrow at the bottom of the diagram, this system also can provide possible outputs of hydrogen (for, e.g., for hydrogen powered vehicles), purified oxygen (for possible medical uses, underwater breathing apparatus, welding, etc.), and optionally hydrocarbon feedstock (for making plastics, medicines, foodstuffs, etc.), as indicated by the dotted output arrows on the right side of the diagram. It will be noted that this system can remove carbon dioxide from the atmosphere, and can also operate using fossil fuels, without releasing carbon dioxide to the atmosphere in either case. The relative inputs to the system can be adjusted to produce the desired ratio of controllable energy output, removal of carbon dioxide from the atmosphere, and production of hydrogen for, e.g., hydrogen powered vehicles. All three of these functions may be required in various proportions as society addresses climate change and transitions to more sustainable infrastructure.

The system in FIG. 5 will now be described in more detail. Water is initially supplied from outside the system to a hydrogen extractor, such as an electrolytic cell, that is powered at least in part by a carbon-neutral energy source. The hydrogen extractor separates the water into hydrogen and oxygen, which may be stored in respective reservoirs. Also, carbon dioxide from the air is supplied to the system, possibly after being captured and concentrated by means of a $CO_2$ capture device that will be described later. The $CO_2$ is then reacted with hydrogen from the hydrogen reservoir in a carbon reduction chamber to produce hydrocarbons, which may then be stored in an optional hydrocarbon reservoir. These hydrocarbons may be used as fuel for the next stage of the system, be extracted for use as hydrocarbon feedstock, or both. Next, the fuel, which may be hydrocarbons, hydrogen, or both, is sent to the fuel reaction chamber, where it is combined with oxygen (optionally from the oxygen reservoir) to produce energy, which can provide a controllable energy output. The fuel reaction chamber converts the fuel to water and $CO_2$ (if hydrocarbon fuels are used). The water and $CO_2$ can be recovered and recycled back into the system by means of a $CO_2$ capture device such as the one described later in this application. Some of the energy produced may be used to power internal processes within the system, such as the hydrogen extractor, the carbon reduction chamber, the $CO_2$ capture device, and the fuel reaction chamber itself During system startup or at times when insufficient fuel reserves have been built up using the carbon-neutral energy source, it may be necessary to supply external hydrocarbon fuels to the system. However, the $CO_2$ capture device assures that no $CO_2$ greenhouse gas will be released to the atmosphere by the operation of this system.

Figure 6:
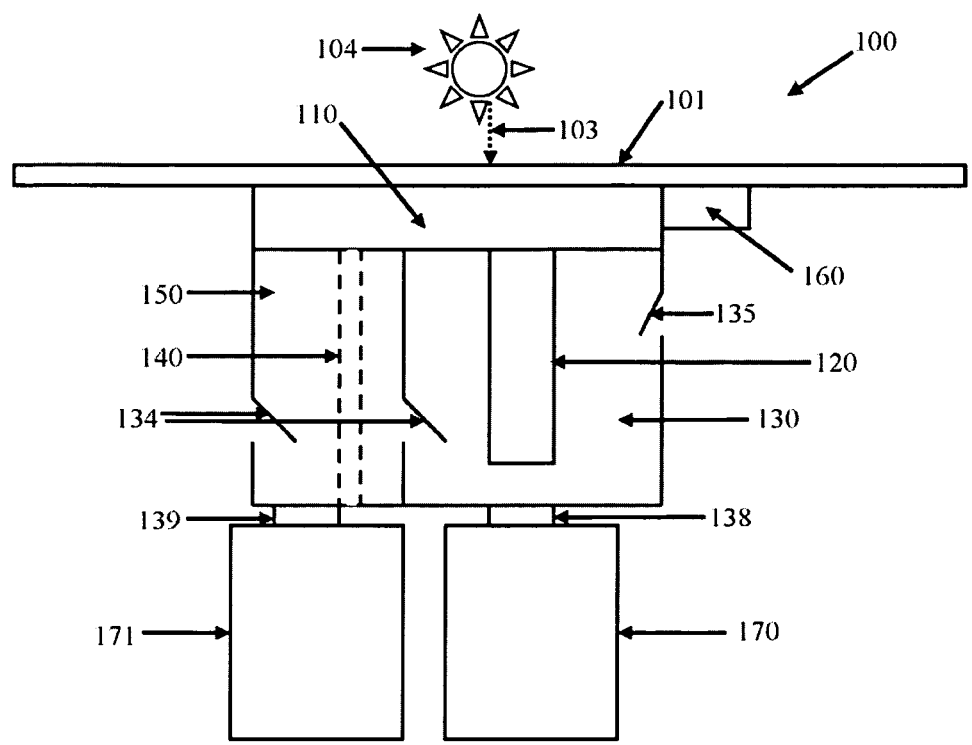
FIG. 6 shows a cross-section view of a solar-powered gas capture device.

One embodiment of the $CO_2$ capture device of FIG. 5 is the invention described in commonly owned and currently pending patent application "Apparatus and Method for Collecting an Atmospheric Gas", U.S. Patent Application 60/900,564, filed Feb. 9, 2007, one embodiment of which is shown in FIG. 6. The $CO_2$ capture device shown in FIG. 6 removes $CO_2$ from the atmosphere (or from a gas stream) by taking advantage of the difference in condensation temperatures of the gases and vapors in the atmosphere. At normal atmospheric pressure, water vapor normally condenses to a liquid at some temperature below room temperature (the dew point), and solidifies to ice at 0° C. $CO_2$ condenses directly to a solid ("dry ice") at −79° C., and converts back to a gas (sublimes) when heated above that temperature. $O_2$ and $N_2$ condense to liquids at −183° C. and −196° C., respectively. Thus, if air comes in contact with a surface having a temperature slightly below −79° C., any $H_2O$ and $CO_2$ in the air will deposit on the surface as a mixture of ice and dry ice. These two components could be separated by a 2-stage cooling process. If the air first comes in contact with a surface having a temperature between the dew point and 0° C., the water vapor would condense out as a liquid, which could be drained away, and the remaining air would now be "dry". If the dry air then comes in contact with a surface having a temperature slightly below −79° C., relatively pure $CO_2$ would condense on the surface. This collected $CO_2$ could then be stored or chemically reacted to remove this greenhouse gas from the atmosphere.

FIG. 6 illustrates a first embodiment of a $CO_2$ capture device 100 for use with the present invention. The $CO_2$ capture device 100 shown in this figure includes an optional "carbon-neutral" energy source, in this case a photovoltaic solar panel 101, although the $CO_2$ capture device shown in FIG. 5 would not need to be directly connected to the carbon-neutral energy source. A suitable solar panel would be one or an array of SunPower model SPR-90, available from SunPower Corporation, Sunnyvale, Calif., USA. Solar panel 101 receives electromagnetic energy 103 from a source 104, such as the sun. Panel 101 converts electromagnetic energy 103 to electrical energy, which powers cooling unit 110. In this example, cooling unit 110 is shaded from direct sunlight by solar panel 101, thus reducing the heat load on cooling unit 110 and making the system more efficient. If the target gas to be collected is $CO_2$, cooling unit 110 must be capable of cooling condenser 120 to less than −79° C. when supplied with adequate power. The cooling unit could be selected from any of a variety of technologies, such as Joule-Thomson coolers, Peltier coolers, Stirling coolers, pulse tube cryocoolers, thermoelectric coolers, etc. When the condenser is at a temperature less than −79° C., carbon dioxide (and any water vapor) from the air in contact with the condenser will form a coating of deposited dry ice (and ice) on the surface of the condenser.

The chilled condenser 120 is enclosed in a collection chamber 130 that has at least one gas entrance port 134, and optionally one or more gas exit ports 135. Collection chamber 130 may also have an extraction port 138 to facilitate removal of the collected target gas from collection chamber 130. Gas entrance port 134 may function as a check valve, opening to allow air flow into collection chamber 130 when the pressure outside 130 is greater than the pressure inside, but closing to form an airtight seal when the pressure inside chamber 130 is greater than the air pressure outside. When cooling unit 110 is energized and condenser 120 is cooled, the air within the collection chamber will be cooled and will contract, reducing the pressure within collection chamber 130 below the pressure of the outside air (assuming valves 135 and 138 are closed), causing a check valve at gas entrance port 134 to open and allow more air to flow into collection chamber 130. The target gas (e.g., $CO_2$) in the added air will condense as a liquid or solid on the condenser, further reducing the interior pressure in collection chamber 130, continuing the process. (Alternatively, valves 134 and 135 may be held open, allowing a continuous flow of gas past the condenser for capturing $CO_2$.) If condenser 120 is then allowed to warm above the condensation temperature of the target gas, either for an intentional purge cycle or due to reduced power input to cooling unit 110 (e.g., at night for a solar powered unit), some of the condensed target gas will re-vaporize, raising the pressure in collection chamber 130, clamping the check valve at gas entrance port 134 shut, and trapping the target material in collection chamber 130. Optional extraction port 138 may include a check valve that opens when the pressure inside collection chamber 130 is greater than the pressure on the other side of extraction port 138, thus allowing the collected target material to be directed into a removable container or a permanently attached plumbing system. Alternatively, if the target gas is being condensed to a liquid rather than a solid, extraction port 138 may include a liquid "trap" seal made of an "S"-shaped pipe, similar to the plumbing traps used under a lavatory sink Referring again to FIG. 6, an embodiment having both a gas entrance port 134 and at least one gas exit port 135 can be employed, if it is desired to achieve a greater collection rate of the target gas by causing a continuous flow of air through collection chamber 130 past condenser 120. For this embodiment, entrance port 134 and exit port 135 are normally open when condenser 120 is at or below a desired condensation temperature, and are sealed when condenser 120 is above the desired temperature. To minimize energy usage, the valves in entrance port 134 and exit port 135 could contain bistable valves connected to a valve actuator and a passive temperature sensor that monitors the condenser temperature. Alternatively, entrance port 134 and exit port 135 could contain valves that are held open (e.g., by solenoids) while solar panel 101 is generating sufficient electrical energy, but that close and seal when the electrical output drops below some minimum level. In FIG. 6, collection chamber 130 is arranged with entrance port 134 low on one side of the chamber and exit port 135 high on the other side of the chamber, to encourage increased air flow due to natural convection. Additionally, exit port 135 is located closer than entrance port 134 to solar panel 101, which is heated by direct sunlight. This further enhances the natural convection flow through collection chamber 130, by making air high in the chamber near the exit port warmer. Alternatively, a fan, air pump, or other air flow enhancing device may be included with $CO_2$ capture system 100.

FIG. 6 also shows a method of collecting water vapor from the atmosphere (or from the effluent gases from the fuel reaction chamber in FIG. 5) and separating it from the $CO_2$. To facilitate the collection and separation of water vapor, this $CO_2$ capture device also includes an optional auxiliary extraction port 139 and a precondenser 140. Items 139 and 140 may be located in collection chamber 130, or they may both be located in a separate precondenser chamber 150. If it is desired to separately collect water vapor and $CO_2$, or to obtain $CO_2$ that is relatively free of water, precondenser 140 would be connected to cooling unit 110 and maintained at a temperature between the dew point and $-79°$ C., and preferably between the dew point and $0°$ C. Precondenser 140 could be a screen or grid structure, or a series of baffles, that provide significant cold surface area for condensing water vapor, but that still allow adequate air flow to and through the collection chamber 130. Water vapor condensing on precondenser 140 as liquid water would drain down to the bottom of the chamber 130 or 150, where it could be removed through an extraction port 138 or 139. Optional reservoir 170 and auxiliary reservoir 171 could receive and contain $CO_2$ from extraction port 138 and water from auxiliary extraction port 139, respectively. If an auxiliary extraction port 139 is used, it could be a drain with a liquid "trap", as described above for item 138. The water removed through auxiliary extraction port 139 could be routed to the hydrogen extractor of FIG. 5 to undergo chemical reactions powered by the same or a different carbon-free energy device.

An optional energy storage unit 160, such as a battery or a hydrogen fuel cell, is also shown in FIG. 6. Energy storage unit 160 may collect and store excess energy generated by the carbon-free energy source, and then may release this energy to continue operation of the gas capture system 100 when the primary carbon-free energy source output is low (e.g., on partly cloudy days or at night, for a solar panel.)

The fuel reaction chamber in FIG. 5 may generate significant heat, particularly if it uses an exothermic reaction such as combustion. The energy released in the fuel reaction chamber may, for example, operate the power generation subsystem by boiling water to produce steam, which then turns a turbine generator to produce electricity, as the steam is turned back into water, which is then boiled again according to a thermodynamic Carnot cycle. The generated heat may also be used to help operate other portions of the system, such as the carbon reduction chamber. Similarly, the generated electricity may be used to power other portions of the system, such as the hydrogen extractor, the $CO_2$ capture device, and any necessary sensors, pumps, and valves needed to transport materials between various portions of the system. The $CO_2$ capture device of FIG. 6 requires a refrigeration unit to condense $CO_2$ and, optionally, water vapor. The $CO_2$ capture device of FIG. 6 could be arranged to receive the exhaust gases from a combustion fuel reaction chamber by passing the hot exhaust gases through a counter-flow heat exchanger (FIG. 7) to the cold precondenser 140 and condenser 120, where the water vapor and $CO_2$ would be condensed and collected. Any remaining chilled gases from the exhaust gas, such as nitrogen or unreacted oxygen, would then be fed back through the counter-flow heat exchanger to cool the incoming exhaust gases. The counter-flow heat exchanger minimizes wasted energy, by not requiring excessive cooling power to chill the precondenser 140 and condenser 120. Also, to the extent that the precondenser 140 is below ambient temperature, the energy efficiency of the Carnot cycle of the power generation subsystem may be increased by using the condensed water from the precondenser as a heat sink for the Carnot cycle engine. It should be mentioned here that each of the internal processes and devices in this system will have less than perfect efficiency, and will represent some energy loss. That loss must be made up by the carbon-neutral energy source, or by the chemical energy available from any optional external hydrocarbon fuels provided to the system. This system is not single-mindedly designed to extract the maximum energy from fossil fuel, regardless of the environmental consequences. The goal of this system is to sustainably provide reliable, controllable power without releasing $CO_2$ greenhouse gas to the atmosphere, and preferably, to actually cause a net decrease in the amount of atmospheric $CO_2$. Useful byproducts of the system, produced in controllable variable amounts, may be sold to offset the added cost of the system. For example, a "hybrid" electric power station based on the system in FIG. 5 could not only produce electrical power, but could also sell hydrogen gas and hydrocarbon fuels for vehicles, hydrocarbon feedstock, and oxygen gas for welding or medical uses.

Figure 7:
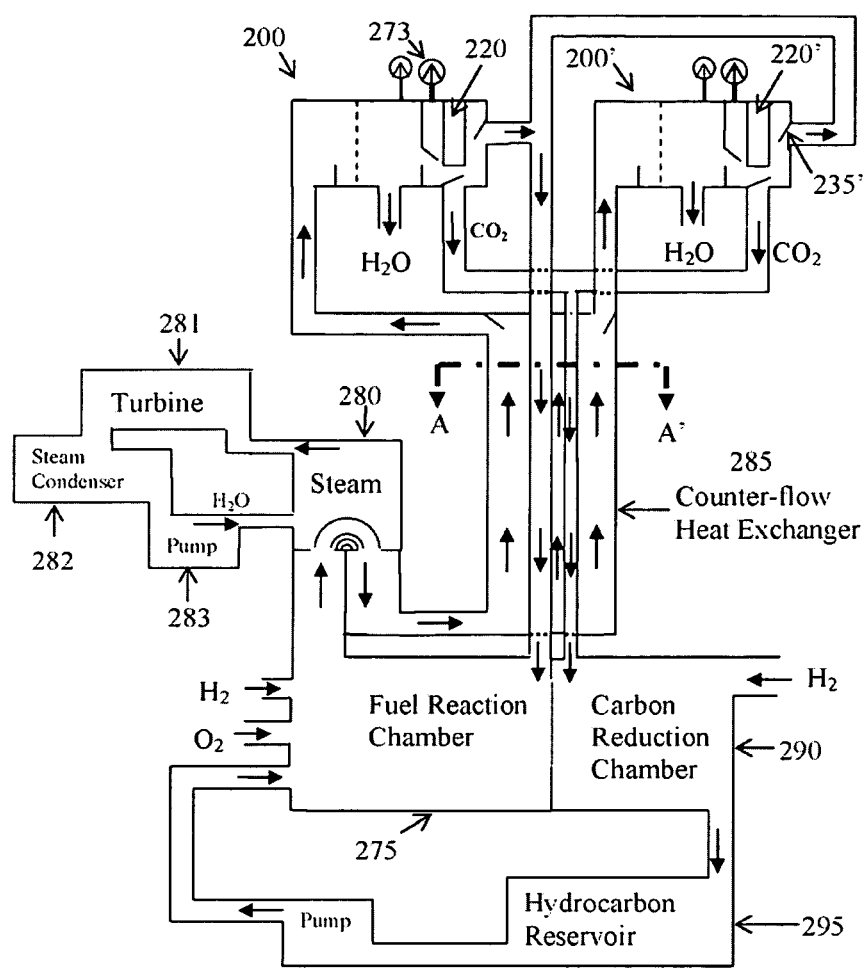
FIG. 7 schematically illustrates a cross-section of a power generation system having two gas capture devices receiving reaction product gases from the fuel reaction chamber by way of a counter-flow heat exchanger.

A diagram of a power plant embodiment of this invention using a counter-flow heat exchanger is shown in FIG. 7. In this system, the fuel reaction chamber 275 receives oxygen and fuel, which may be hydrogen, hydrocarbons, or both. The oxygen and hydrogen may be supplied from a hydrogen extractor, as shown in FIGS. 3-5. The fuel chemically reacts with oxygen (e.g., by combustion) to produce heat and reaction products, such as water vapor and carbon dioxide. A diluent or carrier gas such as nitrogen may also be present. The hot reaction products leave the fuel reaction chamber and pass through a steam generator 280, where some of the thermal energy of the reaction products is used to boil water to produce steam. This steam may be used as the working fluid in a Carnot cycle process, as indicated by the closed loop including the steam generator 280, turbine 281, steam condenser 282, and pump 283. The steam imparts some of its thermal energy to the turbine blades as kinetic energy, causing the turbine shaft to rotate, allowing the turbine to power an electrical generator or a mechanical drive shaft. The steam that has passed through the turbine 281 is then cooled and re-condensed to liquid water in the steam condenser 282, thus reducing the pressure in the steam condenser and causing more steam to blow through the turbine, due to the pressure difference across the turbine. The condensed water is then pumped back into the steam generator 280 by pump 283, to repeat the cycle.

Figure 8:
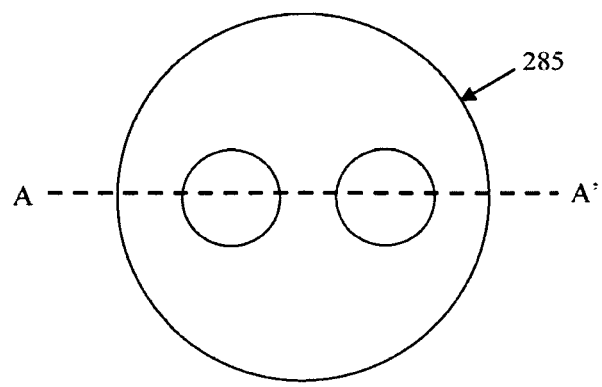
FIG. 8 shows a cross-section of the counter-flow heat exchanger of FIG. 7, viewed at line AA' of FIG. 7.

In FIG. 7, after the reaction products have given up some of their thermal energy in the steam generator 280, they are then sent through a counter-flow heat exchanger 285 toward the $CO_2$ capture device(s) 200, 200', which are similar to the device shown in FIG. 6. The $CO_2$ capture devices in FIG. 7 also include precondensers to collect and remove water vapor from the reaction product gases. FIG. 7 shows two $CO_2$ capture devices 200, 200' connected in parallel, such that the condenser 220 of one capture device can be held at a temperature below $-79°$ C. to condense and capture $CO_2$ while the other capture device is being shut off from the incoming reaction products and warmed above $-79°$ C. to release the collected $CO_2$, to force the $CO_2$ onward through the counter-flow heat exchanger 285 to the carbon reduction chamber 290. The gas flows are controlled by a variety of valves, such as gas exit port valve 235', and monitored by temperature and pressure sensors, such as pressure sensor 273. Since the released $CO_2$ will still be cold, passing it through the counter-flow heat exchanger will help warm the $CO_2$ to the temperature of the carbon reduction chamber, while at the same time pre-cooling the reaction product gases that are heading towards the other $CO_2$ capture device. The $CO_2$ capture devices 200, 200' in FIG. 7 are also shown having bypass outlets, through which any excess oxygen, unreacted fuel, uncondensed reaction products, or diluent gas can also pass through the counter-flow heat exchanger back into the fuel reaction chamber. This counter-flow arrangement minimizes the energy needed to cool or heat the materials for the next steps in the process. A cross-section of the counter-flow heater exchanger 285 in FIG. 7, taken along line AA', is shown in FIG. 8. Multiple tubes, or tubes of different shapes, may be substituted for either or both of the inner tubes of the heat exchanger carrying $CO_2$ and returned gases, in order to increase the area for heat transfer, thus improving the efficiency of the heat exchanger.

The chemical processes in the carbon reduction chamber 290 will typically be endothermic. Therefore, the carbon reduction chamber 290 is shown adjacent to the fuel reaction chamber 275, so the carbon reduction chamber processes can make use of the heat and high temperatures (and perhaps high pressures) produced in the fuel reaction chamber.

In the carbon reduction chamber 290 of FIG. 7, the collected $CO_2$ is reacted with hydrogen to produce hydrocarbons, which are then stored in the hydrocarbon reservoir 295. Depending on the chemical reactions occurring in the carbon reduction chamber, some $H_2O$ may also be produced. It may be desirable to separate this water from the hydrocarbons. However, if the water is left with the hydrocarbons and is pumped into the fuel reaction chamber, the water will eventually be collected at the precondensers of the $CO_2$ capture devices and removed from this portion of the system. Since the water collected at the precondensers will be relatively cool, it would provide an excellent heat sink material for the steam condenser 282 of the Carnot cycle power generation subsystem.

The system of FIG. 7 could be combined with a carbon-neutral energy source and a hydrogen extractor, as shown in FIG. 5. Such a system could be used to generate power, to remove the greenhouse gas carbon dioxide from the atmosphere, or both. In addition, such a system could provide an economically important source of hydrocarbon feedstock, hydrogen for hydrogen-powered vehicles, oxygen for medical or welding uses, etc.

While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A power generation system comprising:
    a power generation subsystem capable of providing controllable energy output;
    a fuel reaction chamber in which energy to be provided to the power generation subsystem is obtained by oxidation of at least one hydrocarbon fuel, wherein said oxidation produces at least carbon dioxide ($CO_2$);
    a CO2 capture device capable of capturing at least a portion of any carbon dioxide produced by the oxidation of the at least one hydrocarbon fuel in the fuel reaction chamber;
    a carbon reduction chamber adapted to receive $CO_2$ from the $CO_2$ capture device and to reduce the chemical oxidation state of the carbon atoms of the received $CO_2$; and
    a carbon-neutral energy source from which energy can be obtained with essentially no release of carbon dioxide to the environment during extended operation of the carbon-neutral energy source
    wherein energy from the carbon-neutral energy source is used in the carbon reduction chamber, directly or indirectly, to reduce the chemical oxidation state of carbon atoms of the carbon dioxide in the carbon reduction chamber.

2. The power generation system of claim 1, wherein reducing the chemical oxidation state of the carbon atoms of the carbon dioxide in the carbon reduction chamber produces at least one second-generation hydrocarbon fuel.

3. The power generation system of claim 2, wherein the power generation system is adapted to direct the at least one second-generation hydrocarbon fuel to the fuel reaction chamber.

4. The power generation system of claim 3, wherein the carbon-neutral energy source is an intermittent energy source for which the timing and amount of energy availability is not readily controlled, and essentially no carbon dioxide is released to the environment during extended operation of the power generation system.

5. A method of providing controllable energy output with significantly reduced or minimal release of carbon dioxide to the environment, comprising the steps of:
    providing the power generation system of claim 3;
    providing a quantity of oxygen and of at least one first-generation hydrocarbon fuel to the fuel reaction chamber;
    causing oxidation of the at least one first-generation hydrocarbon fuel in the fuel reaction chamber, thus producing carbon dioxide and providing energy to the power generation subsystem;
    capturing with the $CO_2$ capture device the majority of the carbon dioxide produced by the oxidation of the at least one first-generation hydrocarbon fuel;
    delivering a portion of the captured carbon dioxide to the carbon reduction chamber;
    obtaining energy from the carbon-neutral energy source;
    using the energy from the carbon-neutral energy source, directly or indirectly, to reduce the chemical oxidation state of the carbon atoms of the carbon dioxide in the carbon reduction chamber, thus producing at least one reduced carbon chemical species; and,
    providing a quantity of the at least one reduced carbon chemical species to the fuel reaction chamber and oxidizing the at least one reduced carbon chemical species, which thus serves as a second-generation hydrocarbon fuel.

6. The power generation system of claim 1, wherein the power generation subsystem is a portion of an electrical utility power plant.

7. The power generation system of claim 1, wherein reducing the chemical oxidation state of carbon in the carbon dioxide in the carbon reduction chamber produces chemicals comprising at least one chemical selected from the group consisting of elemental carbon, methane, methyl alcohol, formaldehyde, formic acid, and polyoxymethylene.

8. The power generation system of claim 1, further comprising a hydrogen extractor that provides a source of hydrogen atoms to the carbon reduction chamber 9. The power generation system of claim 1, further comprising at least one electrolytic cell.

10. The power generation system according to claim 1, further comprising a device adapted to capture at least one of water or oxygen that has been chemically generated within the system.

11. The power generation system according to claim 1, wherein the power generation system has a boundary enclosing an interior, the interior containing the power generation system's working fluids $CO_2$ and $H_2O$, and further wherein the power generation system operates as an essentially closed system with respect to the materials $CO_2$, $H_2$, $O_2$, $H_2O$, and hydrocarbons, such that essentially none of these materials pass through the boundary of the power generation system into or out of its interior during normal operation of the power generation system.

12. The system according to claim 1, wherein the system generates hydrocarbon feedstock.

13. A power generation system as in claim 1, wherein the $CO_2$ capture device comprises a cooled gas condenser.

14. A power generation system as in claim 1, wherein the system is mobile.

15. A power generation system as in claim 1, further comprising a fuel cell.

16. A method of providing controllable energy output with significantly reduced or minimal release of carbon dioxide to the environment, comprising the steps of:
providing the power generation system of claim 1;
providing a quantity of oxygen and of at least one hydrocarbon fuel to the fuel reaction chamber;
causing oxidation of the at least one hydrocarbon fuel in the fuel reaction chamber, thus producing carbon dioxide and providing energy to the power generation subsystem;
capturing with the $CO_2$ capture device the majority of the carbon dioxide produced by the oxidation of the hydrocarbon fuel;
delivering a portion of the captured carbon dioxide to the carbon reduction chamber;
obtaining energy from the carbon-neutral energy source; and
using the energy from the carbon-neutral energy source, directly or indirectly, to reduce the chemical oxidation state of the carbon atoms of the carbon dioxide in the carbon reduction chamber, thus producing at least one reduced carbon chemical species.

17. The method of claim 16, wherein the at least one first-generation hydrocarbon fuel is a fossil fuel.

18. The method of claim 16, wherein the at least one first-generation hydrocarbon fuel comprises at least one of coal, oil, natural gas, diesel fuel, gasoline, aviation fuel, or wood.

19. The method of claim 16, wherein the $CO_2$ capture device comprises a cooled gas condenser, and further wherein the carbon dioxide reaches the cooled gas condenser by way of a counter-flow heat exchanger.

20. The method of claim 16, wherein at least one of heat or pressure from the oxidation of the at least one hydrocarbon fuel in the fuel reaction chamber is used to assist the reduction of the oxidation state of the carbon atoms of the carbon dioxide in the carbon reduction chamber.

21. The method of claim 16, wherein the step of using the energy from the carbon-neutral energy source, directly or indirectly, to reduce the chemical oxidation state of carbon atoms of the carbon dioxide in the carbon reduction chamber, thus producing at least one reduced carbon chemical species, comprises carrying out at least one of the Sabatier methanation reaction or the reverse water-gas shift reaction.

22. The method of claim 16, further comprising the step of providing a quantity of the at least one reduced carbon chemical species to the fuel reaction chamber and therein oxidizing the at least one reduced carbon chemical species, which thus serves as additional hydrocarbon fuel.

23. The power generation system of claim 1, further wherein at least one of heat or pressure from the oxidation of the at least one hydrocarbon fuel in the fuel reaction chamber is used to assist the reduction of the oxidation state of the carbon atoms of the carbon dioxide in the carbon reduction chamber.

24. The power generation system of claim 1, wherein the carbon reduction chamber is adapted to carry out at least one of the Sabatier methanation reaction or the reverse water-gas shift reaction.

25. The power generation system of claim 1, wherein the carbon-neutral energy source comprises at least one of solar photovoltaic, solar thermal, hydroelectric, tidal hydroelectric, wave action hydroelectric, nuclear, or geothermal.

26. A controllable power generation system capable of operating with essentially no release of carbon dioxide greenhouse gas to the environment, comprising:
a power generation subsystem capable of providing controllable energy output;
a fuel reaction chamber in which energy to be provided to the power generation subsystem is obtained by oxidation of at least one hydrocarbon fuel, wherein said oxidation produces at least carbon dioxide (CO2);
a CO2 capture device capable of capturing at least a portion of any carbon dioxide produced by the oxidation of the at least one hydrocarbon fuel in the fuel reaction chamber;
a carbon reduction chamber adapted to receive CO2 from the CO2 capture device and to reduce the chemical oxidation state of the carbon atoms of the received CO2; and
a carbon-neutral energy source from which energy can be obtained with essentially no release of carbon dioxide to the environment during extended operation of the carbon-neutral energy source,
wherein energy from the carbon-neutral energy source is used in the carbon reduction chamber, directly or indirectly, to reduce the chemical oxidation state of carbon atoms of the carbon dioxide in the carbon reduction chamber, and further wherein
the power generation system has a boundary enclosing an interior, the interior containing the power generation system's working fluids CO2 and H2O, and further wherein the power generation system operates as an essentially closed system with respect to the materials CO2, H2, O2, H2O, and hydrocarbons, such that essentially none of these materials pass through the boundary of the power generation system into or out of its interior during normal operation of the power generation system.

27. The controllable power generation system of claim 26, wherein all of the at least one hydrocarbon fuel used is produced within the boundary enclosing the interior of the power generation system, starting from an initial loading of CO2, H2, O2, and H2O.

* * * * *